United States Patent [19]

Kay et al.

[11] Patent Number: 5,475,689
[45] Date of Patent: Dec. 12, 1995

[54] CELLULAR TELEPHONE WITH DATAGRAM AND DISPATCH OPERATION

[75] Inventors: Stanley Kay, Rockville; Ashok D. Mehta, Gaithersburg, both of Md.

[73] Assignee: Hughes Aircraft Company, Los Angeles, Calif.

[21] Appl. No.: 275,161

[22] Filed: Jul. 14, 1994

Related U.S. Application Data

[63] Continuation of Ser. No. 870,073, Apr. 17, 1992, abandoned, which is a continuation-in-part of Ser. No. 622,232, Dec. 6, 1990, Pat. No. 5,299,198.

[51] Int. Cl.$^6$ ........................................................ H04J 3/16
[52] U.S. Cl. .................. 370/95.3; 370/100.1; 455/11.1; 455/33.4; 379/59; 379/61; 379/63
[58] Field of Search .................... 370/95.3, 95.1, 370/79, 109, 61, 100.1, 80, 110.1; 375/107; 379/59, 63, 61; 455/11.1, 33.1, 33.2, 33.3, 33.4

[56] References Cited

U.S. PATENT DOCUMENTS

| | | | |
|---|---|---|---|
| 4,455,649 | 6/1984 | Esteban et al. | 370/80 |
| 4,817,190 | 3/1989 | Comroe et al. | 455/11.1 |
| 4,926,495 | 5/1990 | Comroe et al. | 455/54 |
| 5,020,091 | 5/1991 | Krolopp et al. | 379/59 |
| 5,068,916 | 11/1991 | Harrison et al. | 375/107 |
| 5,093,927 | 3/1992 | Shanley | 379/63 |
| 5,097,499 | 3/1992 | Cosentino | 379/63 |
| 5,101,500 | 3/1992 | Marui | 379/63 |
| 5,103,445 | 4/1992 | Östlund | 370/79 |
| 5,111,454 | 5/1992 | Hung et al. | 370/95.3 |
| 5,117,423 | 5/1992 | Shepherd et al. | 370/95.1 |
| 5,208,812 | 5/1993 | Dudek et al. | 370/100.1 |
| 5,218,716 | 6/1993 | Comroe et al. | 455/33.4 |
| 5,228,026 | 7/1993 | Albrow et al. | 370/110.1 |
| 5,255,308 | 10/1993 | Hashimoto et al. | 379/61 |
| 5,259,021 | 11/1993 | Antilla | 379/61 |

FOREIGN PATENT DOCUMENTS

| | | |
|---|---|---|
| 0473355A2 | 3/1992 | European Pat. Off. . |
| 0479477A2 | 4/1992 | European Pat. Off. . |
| WO92/04790 | 3/1992 | WIPO . |

OTHER PUBLICATIONS

David J. Goodman, "Cellular Packet Communications" Aug. 1990, IEEE pp. 1272–1280.

*Primary Examiner*—Douglas W. Olms
*Assistant Examiner*—Shick Hom
*Attorney, Agent, or Firm*—Gordon R. Lindeen, III; Wanda K. Denson-Low

[57] ABSTRACT

A cellular system supports dispatch and datagram operations. The architecture of a conventional cellular system, such as the GSM system, is modified by adding a local area network (TIL) where nodes on the network include various base switching controllers (BSC). The BSC has a Switching Interface Module (SIM) which provides an interface to the TIL. The TIL may also include one or more gateways (40) to landline based networks. The datagram operation uses an appropriate gateway to complete a data path which includes an RF segment to or from the BSC. Dispatch operations provide for switching by the BSC so that switching is at a level below the Mobile Switching Center (MSC). For example, compressed voice traffic received by the BSC may be transmitted over the TIL to another BSC from where it is sent over an RF segment to a mobile receiver (MS).

25 Claims, 5 Drawing Sheets

| FREQ. 1 | MCC | T | T | T | T | T |
| FREQ. 2 | ECC | T | T | ECC | T | T |
| FREQ. 3 | T | ECC | T | T | ECC | T |
| FREQ. 4 | T | T | ECC | T | T | ECC |
| FREQ. 5 | T | T | T | T | T | T |

CELLULAR TELEPHONE WITH DATAGRAM AND DISPATCH OPERATION

RELATED APPLICATION

This is a continuation of application Ser. No. 07/870,073, filed Apr. 17, 1992 now abandoned which is a continuation-in-part of prior application Ser. No. 07/622,232 filed Dec. 6, 1990 now U.S. Pat. NO. 5,299,198 entitled "Method and Apparatus for Exploitation of Voice Inactivity to Increase the Capacity of a Time Division Multiple Access Radio Communications System" and assigned to the assignee of this application. The subject matter of the parent application is incorporated herein by this reference.

TECHNICAL FIELD

The invention relates to cellular radio telephone and more particularly to the provision of datagram and dispatch operations.

BACKGROUND ART

The characteristics and features of AMPS-D and IS-54 are described in the parent application. Cellular telephone systems such as are described in the co-pending application as well as other cellular telephone systems are designed to efficiently connect the mobile subscriber to a conventional telephone connected in the Public Switched Telephone Network (PSTN). There are other applications however in which the architecture is either inefficient or incapable of performing a desired function.

One area in which this architecture is inefficient relates to the transmission and the reception of data via standard protocols such as X.25, NSA, TC/IP etc.

Another problem area is dispatch or fleet call operations. A dispatch or fleet call, contrary to a typical cellular telephone call, is a point-to-multipoint operation. A typical dispatch or fleet call voice message is relatively short and it is inefficient to require a dispatch operator to identify each of the perhaps many individuals to whom the message is to be sent, each time a message was transmitted. In addition, the hierarchy described in the co-pending application does not lend itself to efficient mobile-to-mobile conversations even on a point-to-point basis. More particularly, as described in the co-pending application the PSTN is interfaced to a Mobile Switching Center (MSC). The MSC is connected to a base station sub-system which includes at least one Base Station Controller (BSC) and one or more Base Transceiver Stations (BTS). One of the functions of the BSC is that of expanding compressed speech passing from the mobile to the PSTN in one direction and compressing voice traffic passing from the PSTN to the mobile. As a result, in a mobile-mobile call, under certain conditions compressed speech from the mobile is first expanded in a BSC, passed on to the MSC where it is switched back to a (different) BSC. At that point, the expanded speech is then compressed for transmission to the receiving mobile. This double coding of speech is unduly expensive in that it unnecessarily uses coding capacity. Furthermore, the double coding is deleterious to the maintenance of quality in voice traffic.

SUMMARY OF THE INVENTION

The invention overcomes these difficulties and provides capabilities not heretofore present in mobile cellular telephone systems. More particularly, in order to provide these

2 advantages and overcome the difficulties, a plurality of BSCs (hereinafter referred to as "stations") are interconnected by a local area network referred to as a Traffic Interconnect Local area network (TIL). The station interface to the local area network is provided by a Switching Interconnect Module (SIM).

Voice traffic in a mobile-mobile conversation is received at a SIM in compressed form from an RF segment. Inasmuch as the conversation is destined for another mobile, it is transmitted by the SIM, still in compressed form, onto the local area network. That message is retrieved from the local area network by another station which then transmits it to the receiving mobile over an appropriate RF segment. In this fashion, the compressed speech transmitted by the transmitting mobile is not expanded until it reaches the receiving mobile. By this procedure double coding of speech is avoided.

Because of the mobility of the mobile receivers in a cellular telephone system, the identity of the cell within which a particular mobile station is at any given time is something which may need to be determined before voice traffic can be transmitted to that mobile. In a typical fixed station-to-mobile scenario, the time it takes to locate the mobile may be an insignificant portion of the total duration of a conversation. On the other hand, in a dispatch or fleet call operation where the transmission may be very brief, it would be particularly inefficient to hold up completion of the transaction pending a location of each of the mobiles for which the traffic is destined. Consequently, at least for those mobiles taking part in a dispatch or fleet call operation, the mobiles have the burden of registering with the station controlling a cell when that cell's zone of coverage is entered. As such a mobile moves from one cell to another, it registers with the station controlling the new cell it is entering since all of the stations freely exchange registration information; each new registration effectively deregisters the mobile from its previous cell. As a consequence of registration, therefore, a station can maintain a record of the mobiles within each zone of coverage, or at least a record of the subset of mobiles which are potential recipients in a dispatch or fleet call operation.

Furthermore, in order to handle dispatch or fleet call operations, a set up transaction takes place between a dispatch initiator and a station within whose zone the dispatch initiator is located. This dispatch setup operation transfers, to the station, the identification of each of the mobiles which are to take part in the fleet call or dispatch operation.

Because of the registration information, when a station receives a dispatch setup, it can readily determine which of the members of the dispatch or fleet call operation are within its zone of coverage and which mobiles are not. The setup message, identifying the dispatch pool and its members, may also be sent to the other stations along the TIL, allowing the other stations to register the pool and the identity of its members. Having registered the pool, dispatch transactions can be accommodated, either point-to-multipoint or point-to-point, without further specifying the voice traffic recipient. More particularly, assume that after having transmitted a dispatch setup message, a dispatch initiator transmits a voice message. When that message is received at the station, it is identified as having been received from the dispatch initiator. The identification of other mobiles in the pool serves to provide the necessary addressing information. For those members of the pool which are registered at the station at which the message from the dispatch initiator is received, the station itself can complete the transaction by transmitting the message to the appropriate mobiles. For mobiles which are not registered at the station, the station transmits a message on the TIL, including the identification of the pool. At each other station on the TIL, the address information is compared to the identification of pools associated with mobiles registered for that station. In the event there is a match, the message is copied from the TIL and used to transmit the information to the appropriate mobile. Similar processing occurs in the event that a member of the dispatch pool other than a dispatch initiator replies to a voice message with a voice reply. The voice reply need not be addressed inasmuch as the station has already registered the pool and from that registration can imply the appropriate address for the voice message. Assuming the dispatch initiator is not registered in the same station as is the replying mobile, the station merely puts the voice message on the TIL along with the identification of the pool.

Typically, in a dispatch operation, the dispatch operator's voice messages are intended for each of the other members of the pool whereas replies by the other members of the pool are only intended for the dispatch operator. This procedure is implemented as already described. However, it is also possible to provide for conference calling arrangements wherein the reply is also transmitted to each of the other members of the pool in addition to the dispatch initiator. Clearly, inasmuch as the pool is identified in each of the stations, by identifying the members of the pool, the stations, on receiving a voice reply to a dispatch transaction, can clearly copy that reply to each of the members of the pool in addition to the dispatch initiator.

Rather than addressing the recipient mobiles, dispatch messages need only identify the appropriate pool. Each station, having information respecting not only the pool, but each of its members, can determine from the identify of the mobiles registered, whether or not it has registered any member of any pool. As such a station seeing a message on the TIL identifying only the pool can determine whether or not the message need be copied by determining whether or not a member of that pool is currently registered. Because of the speed of messages on the TIL it is desirable for each station to maintain a running record of any pool for which a member is currently registered as mobiles register and are removed from registration.

While the dispatch initiator may be a mobile, that is not essential to the invention. The dispatch initiator may operate from a station connected in the PSTN. The operators station or associated equipment provides the necessary digital control information, i.e., start of a voice message, identification of the recipient mobiles in the pool, etc.

The Traffic Interconnect Local area network (TIL) also provides connectivity for datagrams. More particularly, using the same registration techniques already described in the case of a dispatch or fleet call operation, a data source can be registered in the station within whose zone of coverage the data source lies. The registration information will also include the identification of the addressee for any data originated by the source. The identification of the addressee may also include (either explicitly or implicitly) an identification of the particular protocol which is employed in the data transmission. Having registered this information at the station, when the data source initiates a data transmission, the information as to the intended recipient of that information need not be explicit. More particularly, the SIM will direct the information to the TIL. The TIL may have one or more data gateway nodes located thereon. The message from a SIM will include an address identifying the appropriate gateway either explicitly or implicitly. In the latter case the message will identify the destination and the appropriate gateway will match the destination address with an address previously registered with the gateway. Similarly, data is transmitted to a particular data terminal in the opposite direction using the same TIL relying on the fact that the associated SIM has information respecting the data terminals within its zone of coverage so that a datagram carrying such an address appearing on the TIL will be copied by the SIM and the information transmitted to the data terminal.

Accordingly, in one aspect the invention provides a cellular mobile telephone system for connecting mobile telephone stations with stations connected in a public switched telephone network, said system comprising:

a plurality of stations, each with an interface to said mobile stations, at least one mobile switching center, said mobile switching center including an interface to said public switched telephone network and an interface to said plurality of stations, and communication means for communicating messages from one station to at least another station, said communication means including a local area network wherein said stations are nodes of said local area network.

In accordance with another aspect, the invention provides a method of providing dispatch operations in a cellular telephone system comprising the steps of:

a) initiating a dispatch setup by transmitting, to a given station, an identification of those mobile stations to be included in a dispatch pool, b) registering, in the given station, an identification for the pool along with the identification of those mobile stations to be included in the dispatch pool, c) initiating a message for transmission to members of the pool by transmitting voice traffic to the given station from the dispatch initiator, d) identifying at the given station those members of the pool not registered with a given station as within a predetermined geographic region, and e) transmitting a message related to the voice traffic, and identifying at least one of the members of the pool identified in step (d), over a traffic interconnection local area network to other stations.

BRIEF DESCRIPTION OF THE DRAWINGS

The invention will be further described in the following portions of this specification when taken in conjunction with the attached drawings in which.

DETAILED DESCRIPTION OF PREFERRED EMBODIMENTS

Figure 1:
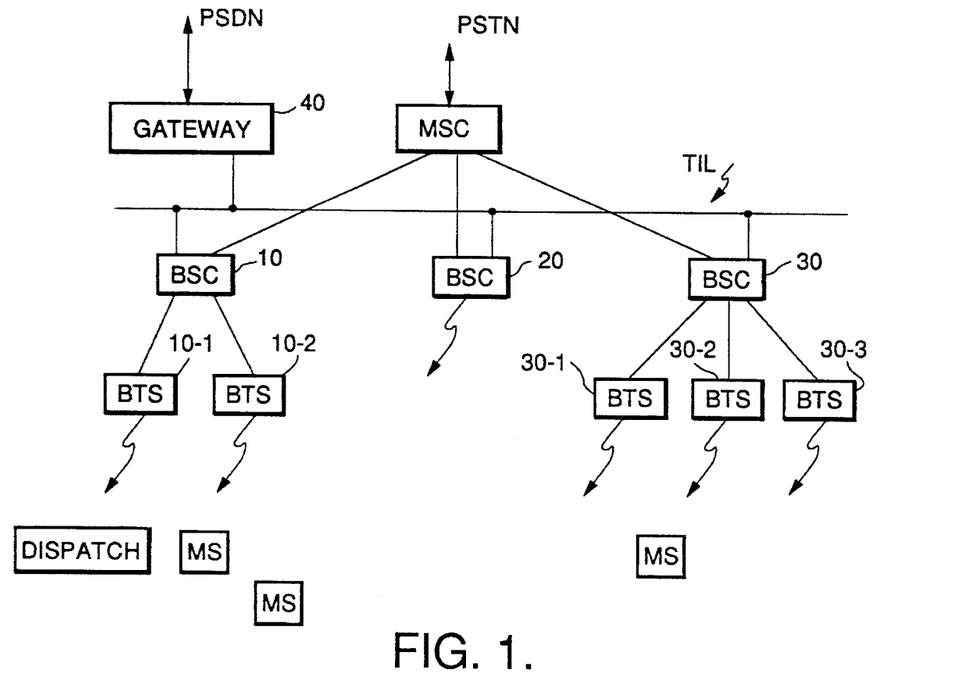
FIG. 1 is a block diagram of a cellular telephone system incorporating the present invention.

FIG. 1 illustrates the major components of the cellular mobile telephone system in accordance with the present invention. As shown in FIG. 1, the Mobile Switching Center (MSC) interfaces to the PSTN on the one side and to several stations (BSCs) 10, 20 and 30 on the other side stations 10 and 30 are similar to each other in that they each interface in turn to multiple Base Transceiver Stations. Station 10 interfaces with BTSs 10–1 and 10–2 whereas station 30 interfaces with BTSs 30–1, 30–2 and 30–3 respectively. Each BTS includes a radio interface and each radio interface operates exclusively within a predefined region in space, i.e. a cell or a portion of a cell. Station 20 also includes a radio interface but that radio interface is incorporated in the station. Several Mobile Stations (MS) are shown in FIG. 1; it should be understood that FIG. 1 only illustrates several mobile stations for convenience. One of the stations which is in communication with the cellular telephone system over a radio interface is identified as a dispatch station. That station need not be a mobile station although there is nothing in the present invention which precludes a mobile station from operating as a dispatch station. The components of FIG. 1 which have been identified so far are similar to the apparatus illustrated in FIG. 37 of the parent application. The present invention differs from the subject matter of the co-pending application by the presence of the local area network TIL, the gateway 40 and the interfaces to the TIL and the improvements which are associated with those components.

The Traffic Interconnect Local area network (TIL) may be a conventional local area network wherein each of the stations 10–30 is a node thereof. In addition, the gateway 40 is another node of the TIL. As shown in FIG. 1 the gateway 40 has an interface to a Public Switched Data Network (PSDN). While FIG. 1 shows only a single gateway, it should be understood that that showing is only illustrative. Multiple gateways, each perhaps operating on a different data transmission protocol may be nodes of the TIL. Furthermore, if desirable or necessary, the TIL may include more than one LAN.

Figure 2:
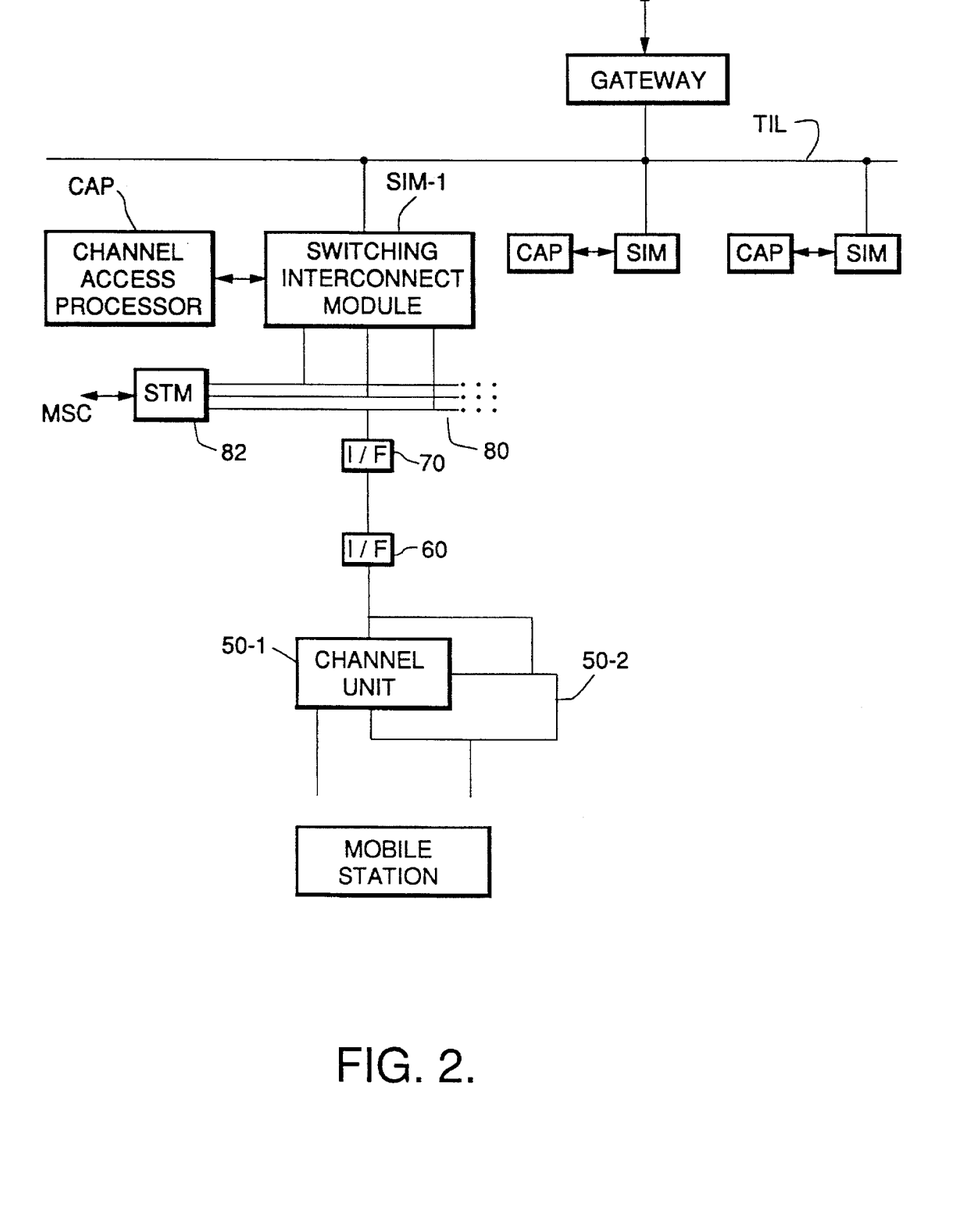
FIG. 2 is a more detailed block diagram showing the components coupled to the Traffic Interconnect Local area network.

FIG. 2 shows some of the apparatus of FIG. 1 in more detail, revealing some of the components within a typical BTS and the components of one of the stations such as stations 10, 20 or 30. More particularly, the BTS includes a plurality of channel units, channel units 50–1 and 50–2 are shown in FIG. 2. The channel units are coupled in turn to BTS/station interface 60 which is coupled to a station/BTS interface 70 which in turn is coupled to a bus 80. The bus 80 in turn is connected to a Switching Interconnect Module (SIM) which is connected to a Channel Access Processor (CAP). The bus 80 is also connected to a Switching Transcoder Module (STM) 82, the output of which is coupled to the MSC. On the other hand, the output of the SIM is coupled to the TIL which, as is seen in FIG. 1, is coupled to other stations (other than the one illustrated in FIG. 2) as well as to the gateway 40. Each of the channel units, the I/F 60, I/F 70, SIM and TIL, carries voice traffic in compressed form. On the other hand, the STM carries out expansion on compressed voice for transmission to the MSC and compression on voice traffic received from the MSC.

The switching transcoder STM handles traffic to and from the MSC, i.e. traffic to and from the PSTN. The SIM (and the associated CAP), on the other hand, handle traffic to and from the TIL. For dispatch or gateway operations, the SIM will copy a message from the bus 80 and place it onto the TIL if the source of that message was a source which is in RF communication with one of the associated channel units 50–1 or 50–2. On the other hand, and as will be described hereinafter, message traffic traveling on the TIL which is destined for a mobile station within the purview of a particular station (such as the one shown in FIG. 2) will be copied from the TIL by the SIM. That traffic will be forwarded to an appropriate channel unit where it will be formatted and transmitted to the destination receiver. The manner in which this operation takes place will be described below. That traffic may be voice messages in compressed form or datagrams.

Figure 3:
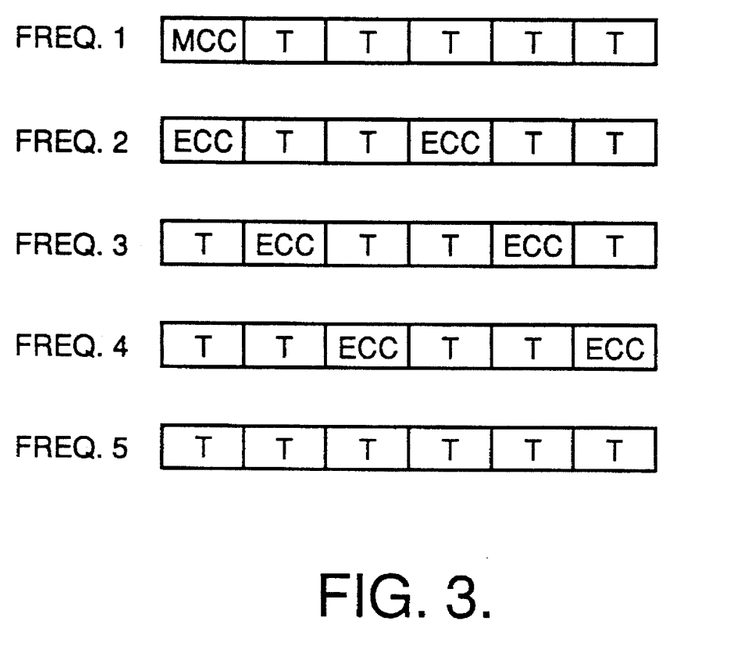
FIG. 3 illustrates a preferred arrangement of traffic and control channels in terms of frequency vs. time for use in accordance with the present invention.

FIG. 3 illustrates a typical DSI pool (similar to FIG. 4 in the parent application). FIG. 3 differs from the DSI pools shown in the parent application in two respects. Firstly, a Master Control Channel (MCC) is shown which is not shown in the parent application. The MCC is added to handle user registration and datagram bandwidth requests as are described below. FIG. 3 shows an ECC, the E-TDMA control channel. This differs from FIG. 4 in the parent application in that the control channel shown in FIG. 4 of the parent application is an analog channel whereas the ECC of FIG. 3 is a digital channel. Before describing several operations in which the invention finds use it is worthwhile to set the background. There are two different accepted forms for the cells in a cellular system. In one form each cell is hexagonal in shape, the RF equipment is optimally located at or near the center and employs omni-directional antennas. As traffic increases the cell may be split into several regions. In this form the RF equipment is located at or near the vertices of the hexagon and the cell area restriction is implemented using directional antennas. The invention finds use with either form of cell and therefore to simplify the following description the term sector is used to apply to either a restricted cell or to the entire cell if it is not restricted.

When used in a dispatch application, a transaction request (dispatch setup) on the MCC is used to define the routing for the dispatch transaction. The routing establishes a multi-destinational, multi-source conferencing capability over many cells in the cellular network so that only cells with mobile stations named in the transaction request are activated. Once the routing has been established by use of the MCC channel, either voice activated or push-to-talk activation can be used to carry voice over the air.

Dispatch Scenario

When a MS powers up, if it is configured for dispatch operation, it performs a registration function as follows. The MS scans the frequencies and locks to the strongest frequency with a MCC. The MS sends a Registration Request on a reverse MCC (RMCC). When received at a BSC, the station performs the following:

1) communicates with the MSC to authenticate the MS and retrieve the attributes for the MS, i.e. dispatch;

2) sends a registration acknowledgement to the MS with the following: the number and frequency of traffic channels, the E-TDMA control channel configuration in the traffic channels, adjacent cell information and a mobile identification.

The MS continues to listen to the ECC, both for the station in which it is registered as well as for adjacent stations.

When the MS detects that an adjacent channel is getting "stronger", it attempts to register with the adjacent cell.

In this fashion, every MS capable of dispatch operation and which is powered on is registered in one or another of the stations in the cellular telephone system. Prior however to initiating dispatch transactions, a dispatch setup is required. The dispatch setup will normally be a transaction carried out by the dispatch initiator, i.e. the dispatcher. In other respects, the dispatcher may be just another typical MS. In the setup operation, a control message is transmitted which identifies each of the MSs to which dispatch transactions should be addressed. This includes not only those MSs registered with the station which receives the dispatch setup message, but it may well include MSs registered in other stations. This operation is shown in the upper portion of FIG. 5.

Figure 5:
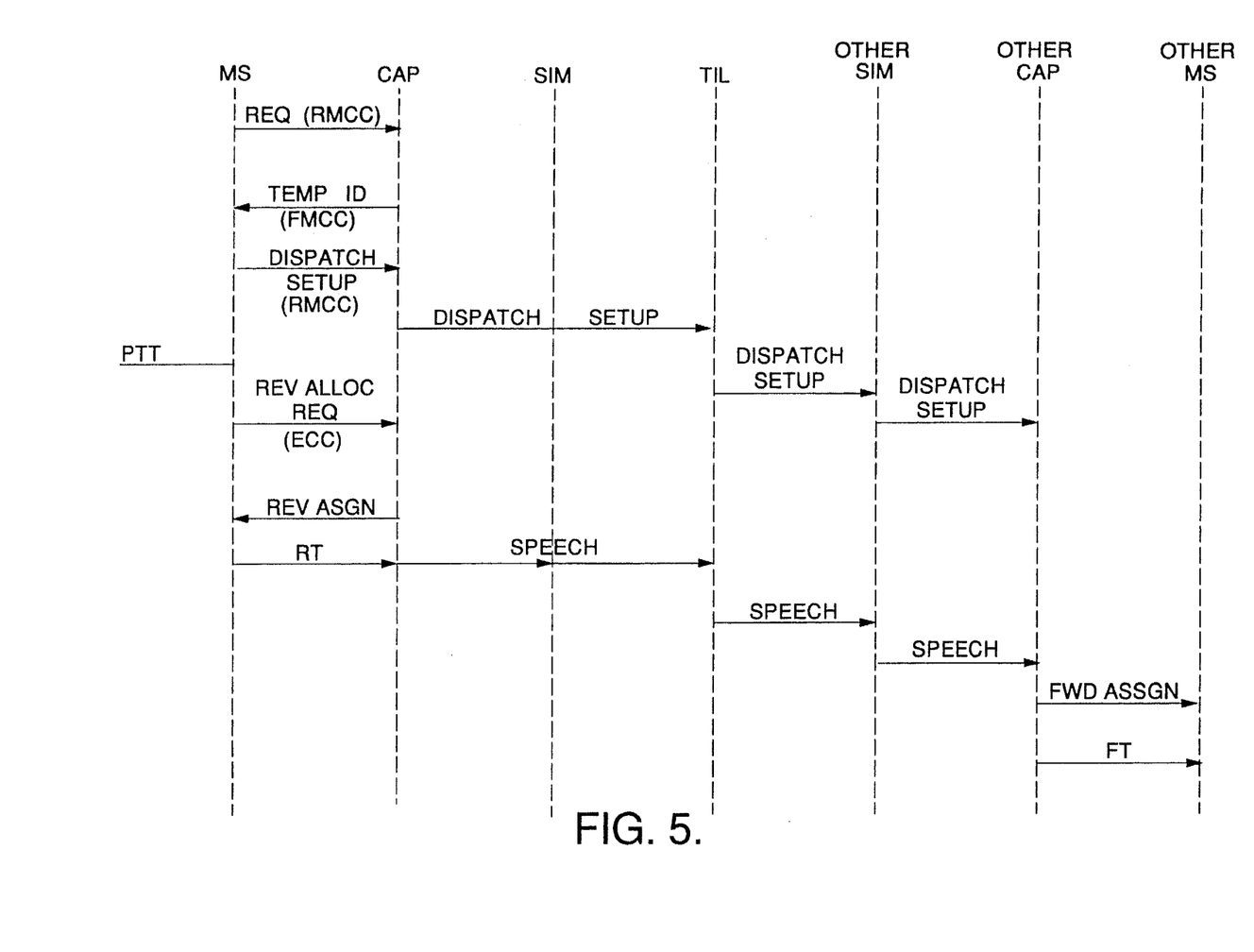
FIG. 5 illustrates a dispatch setup and voice traffic transmission in a dispatch operation in accordance with the present invention.

FIG. 5 illustrates the message transaction sequence carried out between a mobile station (MS), a channel access processor (CAP) an associated SIM and a TIL. FIG. 5 is drawn so that time proceeds from top to bottom.

A first event shown in FIG. 5 is the Registration REQ transmitted on the RMCC by a MS, in this case, the dispatch initiator. In conformance with the diversity features of E-TDMA as described in the parent application, control messages, like the Registration REQ are preferably sent with diversity. Inasmuch as E-TDMA is not essential to use of the invention, however, the use of diversity is not essential. The CAP responds, on the FMCC, with a temporary ID for the MS. The MS responds with a dispatch setup message on a RMCC. As indicated, the dispatch setup identifies each of the other MSs involved in the dispatch operation. This information is registered at the CAP. This information is passed along from the CAP through the SIM and the TIL to other stations. As a consequence, each of the stations 10–30 included in any cellular telephone system will maintain the identification of at least certain of the dispatch pools, that identification including the identification of every MS in the pool. This information will be maintained for a preselected time-out period, however, every time a message is transmitted to the pool, the time-out period will be extended.

FIG. 5 also shows that subsequent to the transmission of the setup message, the dispatch initiator initiates a voice transaction, by operating a push-to-talk (PTT) switch. Those skilled in the art will understand that detection of voice initiation could be used in lieu of the PTT. In any event, an initial event is the transmission of a reverse allocation request (REV ALLOC REQ) on the ECC. As described in the co-pending application, the reverse allocation request includes at least the temporary mobile ID. This identifies the reverse allocation request as having come from the originator of the dispatch setup message and therefore it is directed to the CAP. The CAP responds with a reverse assignment (REV ASGN). This data identifies a particular voice channel. The MS then employs the assigned channel (RT) and transmits a voice transaction. Although FIG. 5 shows the REV ALLOC REQ and REV ASGN as single events, in practice, the reverse allocation request and response may be sent with time, frequency and power diversity as described in the parent application. Furthermore, the RT illustrated in FIG. 5 may only be the initial speech spurt in the message. Each speech spurt will terminate (as again described in the parent application) with a reverse deallocation request and each subsequent speech spurt will be initiated with an additional reverse allocation request and a reverse assignment and terminate with a reverse deallocation request.

Each speech spurt will, however, because it is identified as being sourced at this particular MS, be noted as a speech transaction in a dispatch pool. The CAP and SIM will formulate and transmit a speech spurt to each MS registered with this particular station through an appropriate BTS. In addition, if any member of the pool is not registered with this particular station, a message will be transmitted on the TIL for receipt by each such other MS. At another such station, for example one in which such a MS is registered, the message will be copied by the corresponding SIM and formulated into a speech spurt for transmission to the identified MS. A forward speech allocation is made as shown. In this fashion, the dispatch transaction is accomplished, in other words, each MS in the pool will receive (subject to radio frequency capacity limitations) the voice traffic.

Complementary operation is also envisioned. In other words, if a member of the dispatch pool seeks to reply or otherwise transmit voice traffic to other members of the pool, operations then similar to that shown in FIG. 5 beginning with the PTT will occur. In other words, a replying MS will, on operation of a PTT (or operation of a voice detection switch) initiate a reverse allocation request, on receiving a reverse assignment will transmit reverse traffic to the associated station. The station, having information respecting the particular dispatch pool within which the MS is registered will be able to segregate the other pool members which are registered with it from other pool members which are not registered with it. In respect of those pool members registered with it, a message will be formulated and transmitted to the receiving MSs. For MSs not registered with that particular station, the corresponding SIM will transmit a message on the TIL addressed for receipt by each of the other MSs. In this fashion, reply traffic may be transmitted by a member of the pool and received by each of the other members of the pool.

In order to implement some of the processing which has just been described, the station necessarily has had identified to it, in a received dispatch setup message, the identity of the members of at least one dispatch pool. Table 1 below shows a typical format for this information.

TABLE 1

| Pool ID | Members |
|---------|---------|
| J | 7, 13, 42, 76, 77 |
| K | 3, 9, 15, 27, 33 |

The CAP also has visibility of those mobile stations which are suitable for dispatch operation and which are registered with the station. Table 2 shows the format of that information.

TABLE 2

| Registered Dispatch MS |
|---|
| 3, 7, 15, 33, 77 |

The data shown in Table 1 may be received by a CAP from a dispatch setup transaction which it directly receives over the air. However, information as to the members of a pool may also be received over the TIL from another station. Assume that a CAP at a given station (station 20 for example) maintains information such as is shown in Tables 1 and 2 and the CAP receives a voice transaction from MS 7. Reference to Table 2 reveals that MS 7 is engaged in dispatch operations. Reference to Table 1 shows that MS 7 is in pool J. From the information given in Table 1 with respect to pool J, the CAP extracts information indicating that of the other members of pool J, MS 77 is registered. Accordingly, the station formulates and transmits a copy of the voice transaction received from MS 7 to MS 77. The CAP also orders the associated SIM to formulate messages for transmission on the TIL. Those messages may be explicitly addressed to MS 13, 42 and 76 inasmuch as they are also members of the pool J but not registered with this station. Preferably, however, only a single message is sent, addressed to pool J. If, for example, station 20 has no registered mobiles in pool J, the message may be ignored. On the other hand, at station 30, where MS 13 and 42 are registered, the message will be copied and then sent, explicitly addressed to MS 13 and MS 42.

In the foregoing description the dispatch initiator has been described as a mobile. However a dispatch initiator need not be a mobile. In those cases where a dispatch initiator is not a mobile, it is only necessary for the dispatch initiator to include processing capabilities so that the control information from the operator, i.e., the request for a dispatch setup be properly formulated. Typical mobiles include a keypad for addressing and control purposes. The mobile also includes apparatus for responding to key depressions by encoding corresponding data, formatting and transmitting the data. A non-mobile dispatch station requires similar capabilities. However, rather than transmitting control (and voice) over an RF link, the non-mobile dispatch station typically transmits voice and data over a land-line to a gateway, such as the gateway 40. Typically the dispatch initiator will be connected to a gateway, such as the gateway 40. The dispatch originated control information is packetized and sent to the gateway. At the gateway, operations similar to the previously described operations at the SIM take place. In other words the pool is identified along with the associated mobile members; that data is sent over the TIL to other stations. Typically the only member of the pool registered at the gateway will be the initiator. Other stations receiving data on the pool will identify whether or not pool members are registered. When voice traffic is transmitted the gateway will formulate and transmit the traffic on the TIL along with the identity of the pool with which the traffic is associated. In this fashion the traffic will be transmitted to the appropriate pool members as already described.

Datagram Scenario

Figure 4:
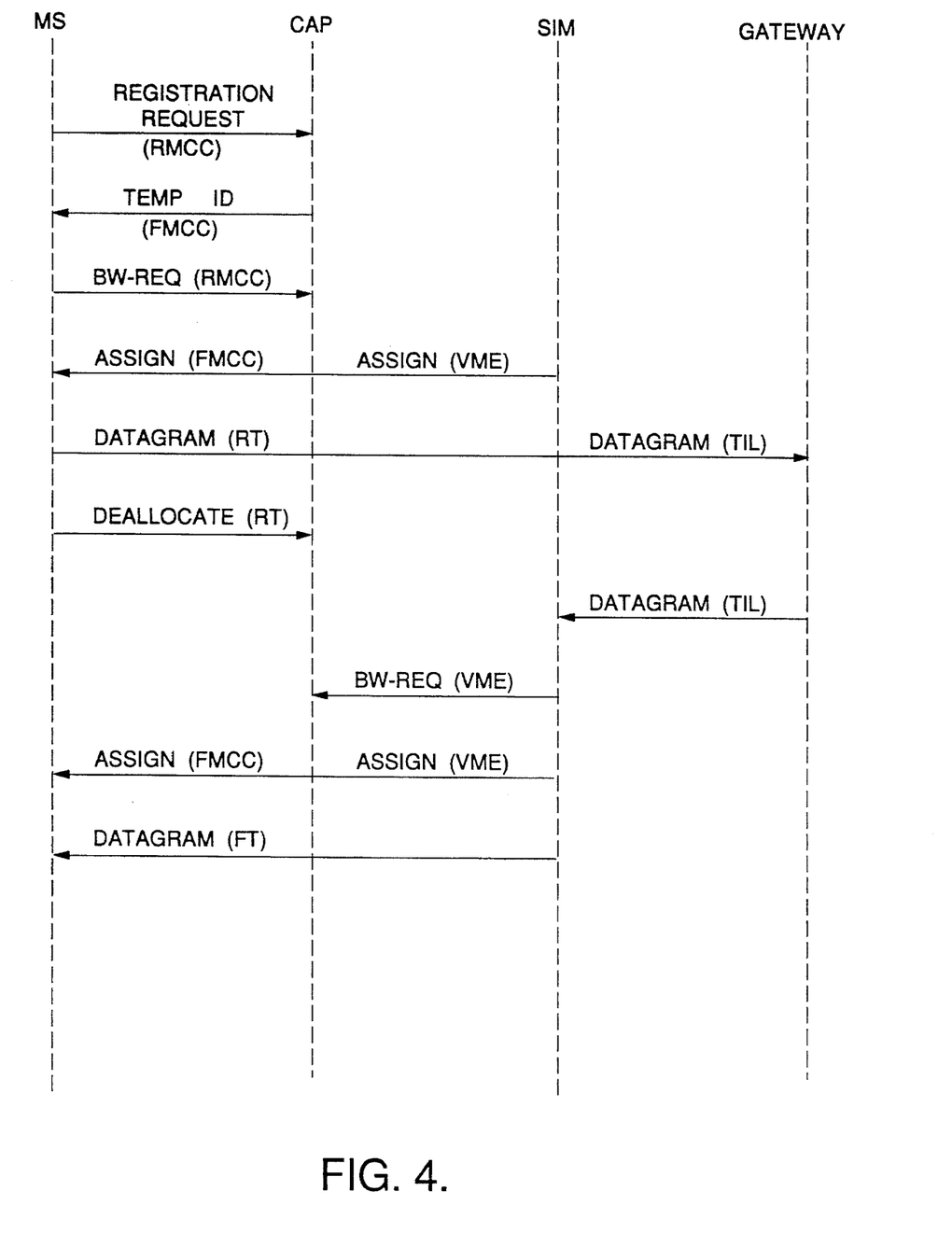
FIG. 4 illustrates the protocol used in the datagram transmission between a datagram initiator and a particular gateway.

For consistency, the following description refers to a source of a datagram as a MS or a mobile. It should be understood that a datagram source requires station equipment similar to that of the mobiles referred to herein. However, there is no requirement that such a station need have the capability of motion. FIG. 4 shows the transactions occurring in a datagram operation. In many respects datagram operation is similar to the dispatch operation already described. There may, but not necessarily, be several variations. Rather than having each mobile taking part in a datagram operation register in the station controlling a sector, a larger operating region, termed a Local Area Identifier (LAI), may be used. The LAI spans several sectors and registration in any station controlling a sector of a LAI is valid for any sector of a LAI. The ID received in registering in one sector may be used for any sector of a LAI. Conversely transmissions to a mobile registered to a LAI necessarily are transmitted in each sector of a LAI. Thus the advantage of limiting the need for frequent registrations is balanced by the need for transmissions in each sector of a LAI. Another variation is whether the mobile registers (whether in a sector or in a LAI) on entering the region or only on the need to send a datagram. If the latter variation is used then account must be taken of the need to transmit to such a mobile which, perhaps may not be registered with any station or LAI. One alternative is to prohibit messages to the mobile. Alternatively the mobile can be paged, register after receiving the page, and only after such registration is the message transmitted. As shown in FIG. 4, a first event is the transmission, by an MS, of a registration request on the RMCC for datagram operations. Preferably, this message is sent with time, frequency and power diversity. The registration request not only identifies the source, but identifies it as a datagram source. As such, later transmission from the source will be routed to the SIM. The registration request may also identify a particular one of plural gateways on the TIL to which data from the source should be routed. The CAP responds to the registration request with a temporary ID on the FMCC. The response may also use diversity. Having been assigned a temporary ID, the MS can initiate a datagram at any time thereafter. As shown in FIG. 4, the next step in initiating a datagram is the transmission of a BW-REQ on the RMCC. This results in the SIM transmitting an assignment of a time slot on the VME bus to the CAP. The SIM responds rather than an STM since by definition the source is engaged in a datagram operation. The CAP in turn transmits an assignment to the MS on the FMCC. This reverse traffic channel is assigned for the duration of the datagram transmission. Using the assigned channel, the MS transmits its datagram on the RT. The datagram is received by the SIM and transmitted over the TIL to the gateway 40. The gateway 40 then processes the data in accordance with the appropriate protocol. Following completion of transmission of the datagram, the MS transmits a deallocate request (RT). That terminates the datagram transmission transaction. FIG. 4 also shows, however, a datagram transmission initiated by an application, i.e. by a source not located in the cellular telephone system of FIG. 1. That datagram is directed to the gateway 40 by some external apparatus. When received at the gateway 40, the data is formed into a datagram and transmitted on the TIL. The MS for which the datagram is destined will have previously registered with a particular station. The SIM of that station will, on recognizing the address component in a datagram, copy the datagram. Thereafter, the SIM formulates a bandwidth request on the VME bus to the CAP. The CAP in turn transmits a VME bus assignment to the SIM and a traffic channel assignment (on the FMCC) to the MS. Thereafter, the SIM transmits the datagram on the FT to the MS.

While datagrams addressed to mobiles may use unique mobile addresses it is within the scope of the invention to employ broadcast type addressing (like the dispatch operation). In other words a datagram pool may include several mobiles so that data to such a pool will reach each of the pool members just as in the case of the dispatch transaction.

The transaction shown at the upper portion of FIG. 4 may be initiated when the particular MS is powered on. The MS attempts to locate an MCC, i.e. a cell equipped with the datagram capability. To the extent that the MS is within radio coverage of such a system, it transmits the registration request shown at the top of FIG. 4. Not shown in FIG. 4 are the transactions involving the CAP and a MSC, whereby the CAP authenticates the MS. Furthermore, FIG. 4 does not illustrate, although it is contemplated, that the MS may respond to the datagram received as illustrated in the lower portion of FIG. 4. Such a response would typically begin with a bandwidth request on the RMCC as is already shown in FIG. 4.

Figure 6:
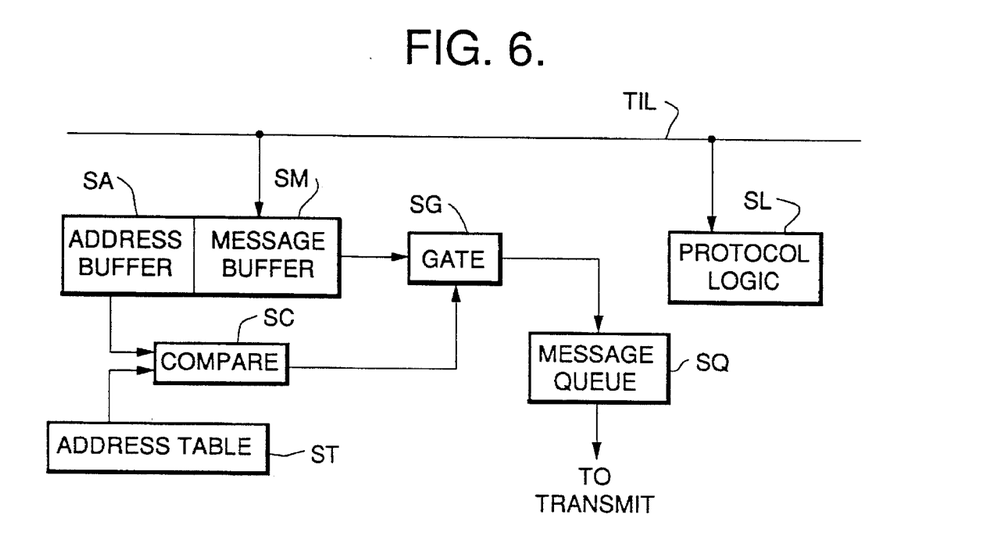
FIG. 6 shows some elements of the Switching Interconnect Module.

FIG. 6 shows some of the components of the SIM. The SIM includes a protocol logic element SL which monitors the signals on the TIL and interprets those signals in accordance with the protocol appropriate to the TIL. Those skilled in the art are aware that there are several different protocols for operation of a local area network as well as the configuration of an appropriate logic element SL to implement access of a node to the local area network. The protocol logic SL generates signals which are coupled to the other components in the SIM. The particular signals which are generated and the components to which they are connected vary with the different protocols and so those signals are not shown in detail. However, the SIM includes an address buffer SA and a message buffer SM. At the appropriate time (as governed by the SL) these buffers are enabled to copy signals off the TIL. The SIM includes an address table ST identifying the addressees for whom the SIM is an agent. The contents of the address table ST may identify those MSs registered with the station within which the SIM is a component. When an address has been received and is stored in the SA, the comparator SC will compare the received address with the addressees listed in the table ST. An equal comparison indicates that a message has been received or is being received which is destined for an MS for which the SIM is an agent. Accordingly, the compare element SC signals a gate SG to allow the message contents, from the message buffer SM, to flow into a message queue SQ. Once a message is on the SQ, it is retrieved, appropriately formatted, bandwidth is requested and the message is forwarded to the appropriate MS over a selected radio interface, as is conventional in cellular telephony. Rather than using a mobile specific address, messages on the TIL may only carry pool identification. In that case each station may determine from a dispatch setup message whether or not any members of the pool are registered. If there are members of a pool which are registered then any message carrying such a pool address are copied. In other words, the table ST may identify pools rather than individual mobiles. Thereafter the SIM determines from the pool address which members of the pool are registered. Armed with this information the SIM formulates and transmits the necessary messages over its associated RF segment.

Although it has been mentioned that an MS participating in a datagram application may register with a station when it powers on, this is not essential, i.e. the MS can register only when it has a datagram to send. Under this circumstance, however, it may be necessary for each station to copy all datagrams from the TIL and attempt to locate the appropriate MS.

Another parameter that has not been mentioned is the size of the sector, i.e. the maximum distance between an MS and a serving station. If this distance is large enough, synchronization bursts may be required either at the time of registration, the time of datagram transmission, or both.

Figure 7:
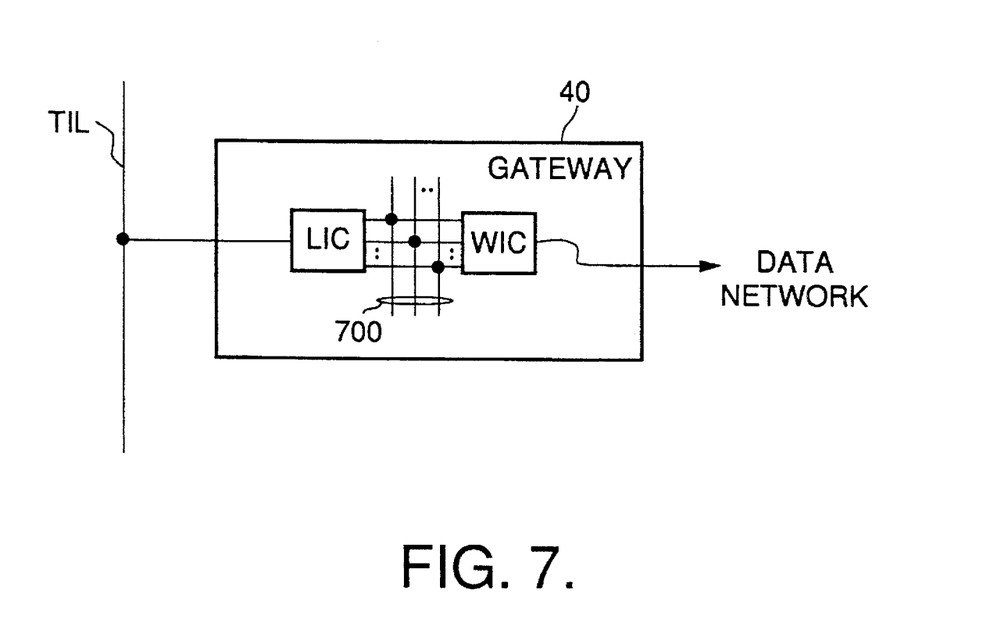
FIG. 7 shows the components of a typical gateway.

FIG. 7 illustrates the components of a typical gateway, such as the gateway 40 shown in FIG. 1. FIG. 7 illustrates that the local area network TIL is coupled to a LAN Interface Card (LIC). The particular form in which LIC is coupled to TIL depends on the particular form of the local area network. Data received from TIL by LIC is output to a bus 700. Data appearing on the bus 700 is, in turn, accepted by WAN Interface Card (WIC). The WIC, in turn, outputs data to an appropriate data network as illustrated in FIG. 7. The LIC and WIC are both commercially available elements and therefore further description is unnecessary.

Although this application shows only a single gateway, it should be understood that this is not a limitation and in fact multiple gateways may be coupled to the TIL. This is an advantage in that each gateway may operate with a different protocol. Furthermore, while FIG. 2 shows a one-to-one relationship between SIMs and CAPs, that too is not essential in that a SIM may be coupled to multiple CAPs, multiple SIMs may be coupled to a single CAP, or both situations may exist. An important hardware advantage is the ability of the SIM to interface to a TIL which may be a very high speed medium. The address comparison, at the SIM for messages passing on the TIL may be implemented in software although additional speed can be obtained by implementing the address comparison and hardware such as by using a content addressable memory. Accordingly, the invention should not be limited to the specific examples described herein. Rather, the spirit and scope of the invention should be construed in accordance with the claims attached hereto.

We claim:

1. A cellular radio telephony system for communication of data, voice or data and voice messages between remote stations, a switched telephone network and a data network comprising:

a plurality of base stations, each base station having a radio frequency interface to said remote stations, there being at least one radio frequency interface for each cell of said cellular system;

a mobile switching center coupled to said switched telephone network and to said base stations for use in transmitting said data, voice or data and voice messages as telephone communications between said remote stations and said switched telephone network over said radio frequency interface; and a local area network, said base stations being coupled to said local area network as nodes for use in transmitting said data, voice or data and voice messages to and from said remote stations over said radio frequency interface.

2. A system as recited in claim 1 wherein said radio frequency interfaces of said base stations operate exclusively within one cell of said cellular system.

3. A system as recited in claim 1 wherein said radio frequency interfaces further include at least one transceiver station, each transceiver station having a radio frequency transceiver for communicating with remote stations operating exclusively within a cell of said cellular system.

4. A system as recited in claim 1 wherein:

said base stations include a codec to compress voice traffic from said switched telephone network for transmission to said remote stations and to expand compressed voice traffic from said remote stations for transmission to said switched telephone network, and wherein said base stations include an interface for transmitting compressed voice traffic onto said local area network.

5. A system as recited in claim 1 in which said base stations include an interface for transmitting compressed voice traffic onto said local area network.

6. A system as recited in claim 1 which further includes a gateway coupled to said local area network with an interface to a switched data network.

7. A system as recited in claim 1 in which said base stations include an interface to said local area network, said interface including means for monitoring messages on said local area network and means for copying those messages addressed to a remote station registered with the base station of the interface.

8. A system as recited in claim 1 wherein said base stations includes a switching interconnection module coupled to said local area network for receiving messages from said local area network for transmission to remote stations and for transmitting messages received from remote stations to said local area network.

9. A system as recited in claim 8 wherein said base stations include a channel access processor for registering remote stations in association with a cell of said cellular system and allocating radio frequency resources to said registered remote stations through said radio frequency interfaces.

10. A system as recited in claim 8 wherein said base stations include a channel access processor for registering remote stations in association with a cell of said cellular system and allocating radio frequency resources to said registered remote stations through said radio frequency interface, said channel access processor being in communication with said interconnection module for regulating the reception and transmission of messages by said interconnection module.

11. A system as recited in claim 10 wherein said channel access processor include a dispatch pool register for associating remote stations with a dispatch pool, said channel access processor regulating the receipt and transmission of dispatch messages received from remote stations by said interconnection modules through said radio frequency interface.

12. A method of providing communication of voice or data or voice and data messages in a cellular radio telephony system having a plurality of remote stations for communicating through a radio frequency interface with a plurality of base stations, said base stations being connected as nodes to a local area network and connected through a switching center to a switched telephone network, there being at least one radio frequency interface for each cell of said cellular system, the method comprising:

receiving registrations through said radio frequency interfaces from said remote stations at corresponding ones of said base stations, said registrations identifying said remote stations for access to said local area network or to said switched telephone network;

recording said registrations at said corresponding base stations;

receiving a message from a registered remote station;

routing said message alternately to said local area network or to said switched telephone network based on said recorded registration.

13. A method as recited in claim 12 wherein said step of receiving a message further includes, receiving a reverse allocation request from said remote station;

transmitting a reverse assignment to the remote station; and receiving said message on said allocated reverse channel.

14. A method of providing communication of voice or data or voice and data messages in a cellular radio telephony system having a plurality of remote stations for communicating through a radio frequency interface with a plurality of base stations, said base stations being interconnected by a local area network, there being at least one radio frequency interface for each cell of said cellular system, the method comprising:

receiving registrations through said radio frequency interfaces from said remote stations at corresponding ones of said base stations;

recording said registrations at said corresponding base stations;

receiving a message for communication to one or more remote stations and, associated with said message, an identification of said remote stations to which said message is to be communicated;

transmitting said message and said associated remote station identification to each of said base stations using said local area network;

at each base station, comparing said associated station identification to said recorded remote station registrations; and if said associated station identification matches a recorded remote station registration, transmitting said message to the corresponding registered remote station through said corresponding radio frequency interface.

15. A method as recited in claim 14 wherein said step of receiving a message comprises receiving a message from a remote station through a radio frequency interface.

16. A method as recited in claim 14 wherein said cellular system further comprises a gateway connected to said local area network and wherein said step of receiving a message comprises receiving a message from an external source through said gateway.

17. A method as recited in claim 14 including the further steps of:

initiating a dispatch setup by receiving an identification of remote stations to be included in a dispatch pool from a dispatch initiator;

registering an identification for the dispatch pool along with the identification of remote stations to be included in the dispatch pool, and wherein said step of receiving a message comprises receiving a message for transmission to members of the pool by receiving said message from the dispatch initiator.

18. A method as recited in claim 17 including the further step of receiving a second message from a member of said dispatch pool for transmission to members of said dispatch pool said member from which said second message is received not being said dispatch initiator.

19. A method as recited in claim 17 wherein said step of receiving an identification of remote stations in a dispatch pool comprises receiving said identification at a given base station from a remote station, wherein said step of registering said identification comprises registering in said given base station an identification for the pool and wherein said step of receiving a message comprises receiving said message at said given base station.

20. A method as recited in claim 17 wherein said step of receiving an identification of remote stations in a dispatch pool comprises receiving said identification at a gateway connected to said local area network from an external source, wherein said step of registering said identification comprises registering in said gateway an identification for said dispatch pool and wherein said step of receiving a message comprises receiving said message at said gateway.

21. A method as recited in claim 17 including the further step of transmitting said identification for said dispatch pool along with said identification of remote stations to be included in said dispatch pool to each of said base stations using said local area network wherein said associated station identification comprises an identification of a dispatch pool and wherein said step of comparing said associated station identification comprises comparing said associated dispatch pool identification with said identification of said pool.

22. A method as recited in claim 14 including the further step of:

at a station other than said given station, copying said message for transmission to a mobile station registered with said other station.

23. A method as recited in claim 22 wherein said associated station identification includes an identification of the source of said message, and said step of transmitting said message at said other station includes identifying the dispatch pool associated with said message by the correlation between the dispatch pool and the source of said message.

24. A cellular radio telephony system for communication of voice or data messages between remote stations, a public switched telephone network, and a public data network comprising:

a plurality of base stations, each base station having at least one radio frequency interface to said remote stations for each cell in said cellular system, each radio frequency interface comprising a forward radio channel for communications from the base station to the remote station and a reverse radio channel for communications from the remote station to the base station;

a mobile switching center coupled to said public switched telephone network and in direct communication with each of said base stations, said mobile switching center capable of directly routing a message from one of said base stations to another of said base stations independent of said public switched telephone network; and a local area network interconnecting the plurality of base stations, said local area network allowing at least one of said base stations to communicate with another of said base stations independent of said public switched telephone network.

25. A method of providing dispatch operations in a cellular telephone system comprising the steps of:

receiving a dispatch setup message at a first base station over a reverse radio channel from a dispatch initiator, said dispatch setup message including an identifier for a dispatch pool, said dispatch pool includes a plurality of mobile stations, and an identifier for each mobile station to be included in the dispatch pool, said mobile stations including a first mobile station registered with said first base station and a second mobile station registered with a second base station;

storing the dispatch pool in a memory in said first base station, said dispatch pool including said dispatch pool identifier and said mobile station identifiers;

transmitting said dispatch pool to said second base station over a local area network, said local area network inter-connecting said first and second base stations;

storing said dispatch pool in a memory in said second base station;

receiving a dispatch transaction message at said base station from said dispatch initiator over a reverse radio channel, said dispatch transaction message comprising a voice traffic burst and said dispatch pool identifier;

comparing said received dispatch pool identifier recovered from said transaction message with said dispatch pool identifier previously stored in said first base station memory;

determining that said first mobile station is registered in said first base station and is a member of said dispatch pool;

transmitting said voice traffic burst to said first mobile station;

determining whether said second mobile station is registered in said first base station;

transmitting over said local area network a message containing said dispatch pool identifier and said voice traffic burst to said second base station;

comparing said dispatch pool identifier with said dispatch pool identifier previously stored in said second base station memory;

determining that said second mobile station is registered in said second base station; and transmitting said voice traffic burst to said second mobile from said second base station via a forward radio channel.

* * * * *